June 26, 1928.
W. C. McCOY
1,674,688
ELECTRICAL INDICATING INSTRUMENT
Filed Aug. 2, 1926
3 Sheets-Sheet 1
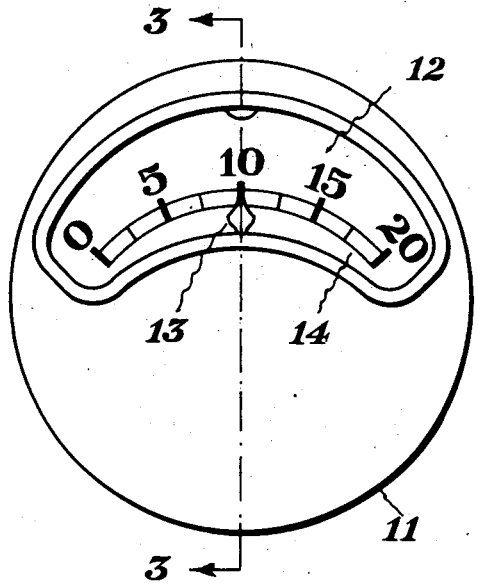
Fig. 1
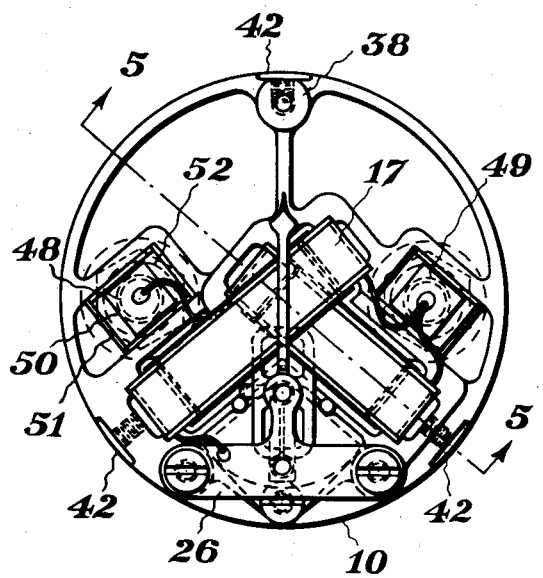
Fig. 2
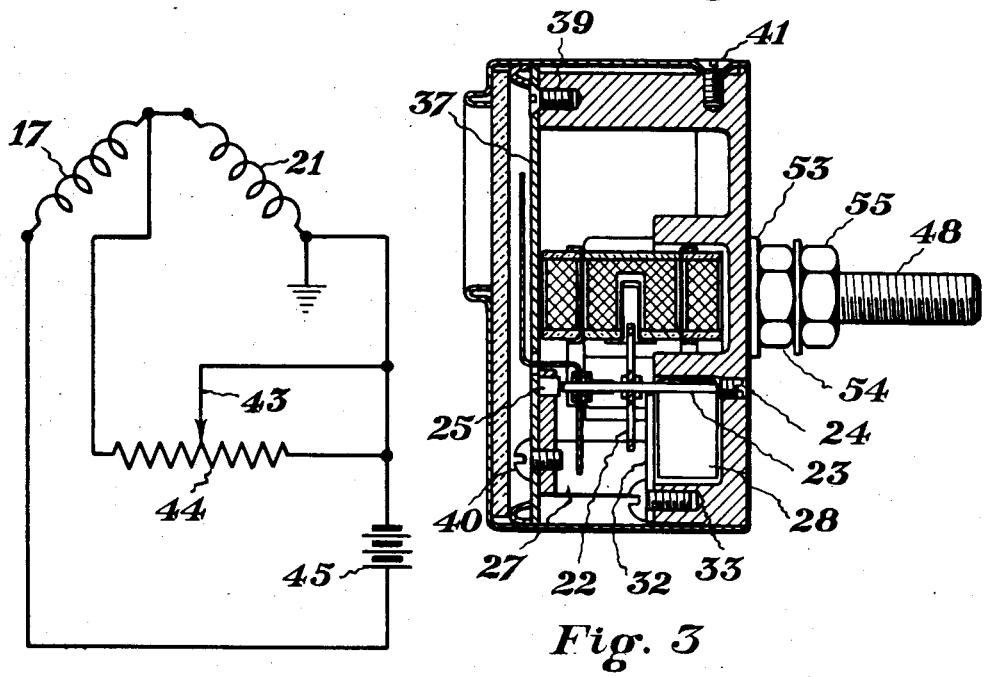
Fig. 4
Fig. 3
Inventor
William C. McCoy.
By Evans & McCoy.
Attorney June 26, 1928.                                               1,674,688
W. C. McCOY
ELECTRICAL INDICATING INSTRUMENT
Filed Aug. 2, 1926     3 Sheets-Sheet 2

Inventor
William C. McCoy.
By Evans & McCoy.
Attorney

June 26, 1928. 1,674,688
W. C. McCOY
ELECTRICAL INDICATING INSTRUMENT
Filed Aug. 2, 1926   3 Sheets-Sheet 3
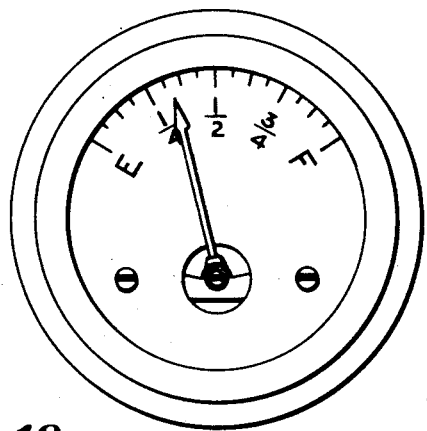
Fig. 10
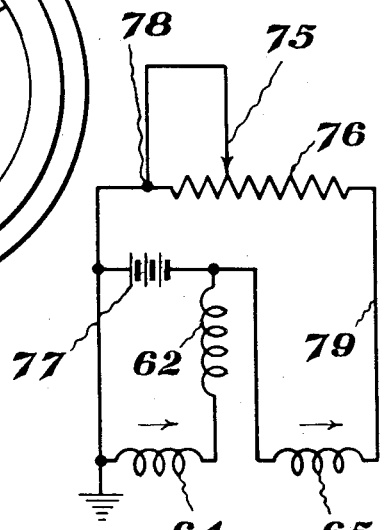
Fig. 12
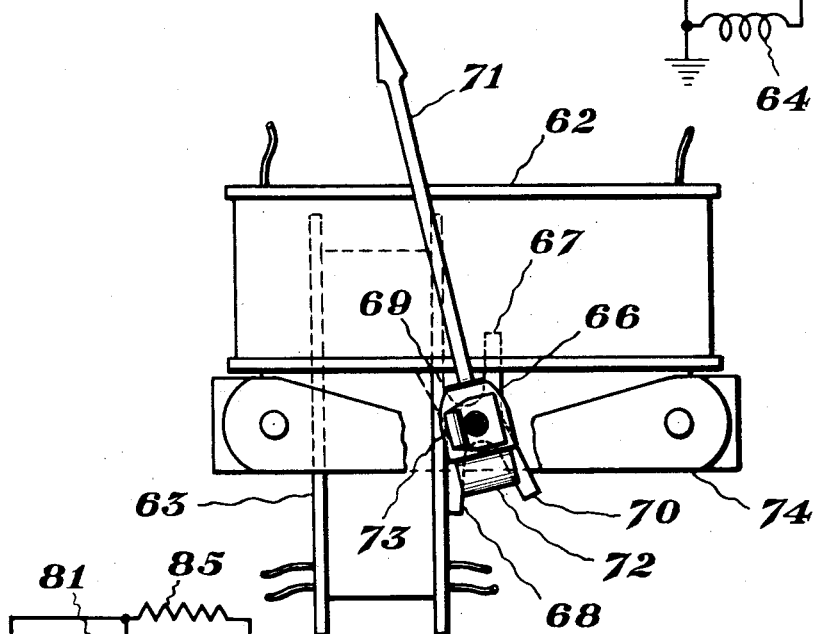
Fig. 11
Fig. 13
Inventor
William C. McCoy.
By Evans & McCoy.
Attorney Patented June 26, 1928.

1,674,688

UNITED STATES PATENT OFFICE.

WILLIAM C. McCOY, OF CLEVELAND, OHIO, ASSIGNOR TO THE CLEVELAND TRUST COMPANY, OF CLEVELAND, OHIO, A CORPORATION OF OHIO.

ELECTRICAL INDICATING INSTRUMENT.

Application filed August 2, 1926. Serial No. 126,610.

This invention relates to electrically controlled instruments and particularly to instruments for use in connection with remotely controlled indicator systems.

One of the objects of my invention is to provide an instrument of such character that it shall be substantially free from variations in its indicating produced by changes in the voltage of the source of energy from which the instrument is controlled.

Another object of my invention is to provide a base for an instrument of this character that may be formed of a die casting and in which the actuating coils for the instrument may be secured in place by cementing the coils in position without the use of other supporting elements therefor.

An additional object of my inention is to provide an armature of magnetic material that is non-symmetrical with respect to its longitudinal central axis and so arranged that its deflection with respect to one control coil differs from its deflection with respect to another coil carried by the same solenoid when the coils are magnetically energized to the same degree.

Figure 1 of the acompanying drawings is a plan view of an assembled instrument constructed in accordance with my invention.

Fig. 2 is a top plan view of the instrument shown in Fig. 1 with the cover removed to illustrate the operating parts of the instrument.

Fig. 3 is a transverse sectional view taken substantially on line 3—3 of Fig. 1.

Fig 4 is a diagrammatic view of a control system adapted for use in connection with the instrument shown in Fig. 1.

Figure 5:
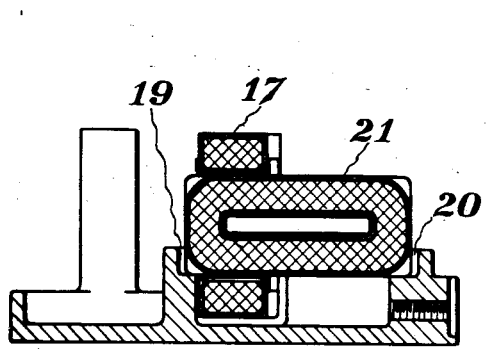
Fig. 5 is a transverse sectional view, with the indicator arm removed, of the instrument shown in Fig. 2 taken substantially on line 5—5.
Figure 6:
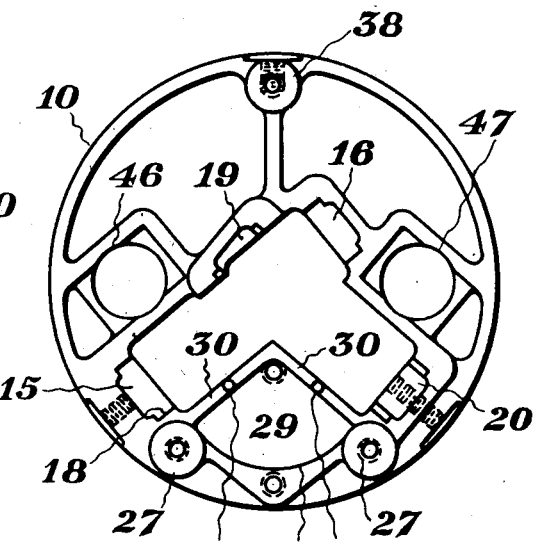
Fig. 6 is a top plan view of the base of the instrument.
Figure 8:
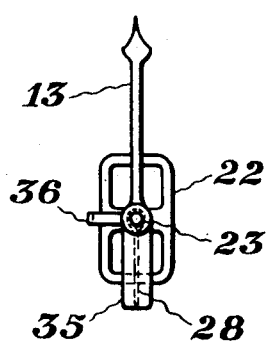
Fig. 8 is a view of the armature and the indicator arm removed from the remainder of the structure.
Figure 7:
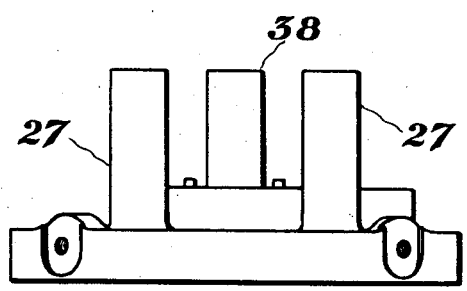
Fig. 7 is a side elevational view of the instrument base shown in Fig. 6.

Fg. 10 is a face view of a modified form of indicating instrument constructed in accordance with my invention; and Fig. 11 is an enlarged top plan view of the instrument shown in Fig. 10 with the cover removed and with a portion of the pivot supporting mechanism for the indicator hand broken away. The electrical circuit and the base of this instrument is illustrated diagrammatically.

Fig. 12 is a diagrammatic view of a control circuit adapted to be used in connection with the invention.

Fig. 13 is a diagrammatic view of a control circuit suitable for use in connection with the invention.

The instrument shown in Figs. 1 to 9, inclusive, comprises a base 10 that supports the operating parts of the instrument and a casing 11 that has a transparent window 12 through which a portion of the indicator arm which traverses an indicating scale 14 is visible.

The base 10 of the instrument is preferably formed of a die casting in which a pair of opposed shelves or pockets 15 and 16 are suitably formed to receive the opposite end portions of an actuating hollow solenoid 17. Each of the pockets 15 and 16 is arranged at a proper level for supporting the under face of the solenoid 17 in such manner that cement, such as a thick asphaltum paint, heavy shellac or varnish, may be used to solely secure the solenoid 17 in position on the base. The base 10 also has a pair of opposed pockets 19 and 20 that are arranged materially above the pockets 15 and 16 and at such a level that they may receive and partially support a second actuating hollow solenoid 21 one end portion of which extends within the hollow solenoid 17 in the manner particularly illustrated in Figs. 2 and 5.

An indicator vane 22 of magnetic material is supported from a pivoted staff 23 in such manner that it may swing partially within the hollow solenoids 17 and 21 and thereby be responsive to the resultant magnetic flux that eminates from the two solenoids. The armature staff 23 is supported at its lower end by adjustable bearing screw 24 of conventional form that is mounted within the base 10 of the instrument. The upper end of the staff is pivotally supported in a bearing member 25 that is in turn carried by a supporting plate 26. The supporting plate 26 is mounted on a pair of pedestals 27 that are carried by the base.

The pivot staff 23 has a damper vane 28 of thin light-weight material that is adapted to be received within a damping chamber 29 that is formed in the base 10. The damping chamber 29 is formed by a pair of upstanding flanges 30 that extend to and join the wall portions of the pockets 15 and 20. An outer wall portion 31 of the chamber is of cylindrical form. The vane 28 is preferably mounted on the pivot staff 23 by bending one portion of the vane closely about the staff. The vane closely fits within the chamber 29 but does not contact with any part thereof. The damping chamber is closed by a pair of opposed plates 32 of substantially triangular form that are secured in place by a screw 33 and a pair of upstanding posts 34 that are formed on the wall portion 30. The plates 32 fit closely around the pivot staff 23 but do not contact therewith. The pointer 13 has an enlarged lower portion 35 that counterbalances the weight of the indicator vane. An auxiliary weight 36, which is also carried by the staff 23, serves to bring the pointer 13 to its zero position when solenoids 17 and 21 are deenergized. This weight is adjustable to provide means for calibrating the instrument.

The scale 14 is formed on a suitable dial plate 37 that is carried by the supporting pedestal 38, to which it is secured by a suitable screw 39, and by the plate 26 to which it is connected by a screw 40. The casing 11 of the instrument is secured in place on the base member 10 by suitable screws 41 that are received in threaded apertures 42 of the base.

The control circuit shown in Fig. 4 is particularly useful with an instrument of this character if it is desired that the instrument be operated from a single control line 43 that extends to any suitable resistance varying device 44 which by its movement varies the current passing through the actuating coils and which may be located at a point remote from the instrument. For instance, the variable resistance may be actuated by the float in the fuel tank of a motor vehicle and the indicating instrument may be mounted at any desired point on the vehicle such as on the dash. The circuit of the instrument is energized from a storage battery 45 or from any source of either alternating or direct current.

Although the coils 17 and 21 are shown as of substantially the same physical cross section, it is desired, if the control circuit shown in Fig. 4 is used, to form the coil 17 of a suitable number of turns of relatively small size wire to give a magnetizing effect of substantially one-half the magnetizing effect of the coil 21 for the circuit condition where the coil 21 is energized to its highest degree or, in other words, by full load current at normal voltage. The coil 21 is therefore preferably formed of a large number of turns of low resistance wire in order that it may produce a field strength of substantially twice the field strength produced by the coil 17 when it is energized to its highest degree. By making the resistance of resistance unit 44 materially higher than the resistance of coil 21, a range of movement of the indicator vane 13 of substantially the degree shown is readily obtainable. The particular relations of the coils 17 and 21, as regards their respective number of turns, their relative resistance, and the relation of the resistance of the rheostat 44 to the resistance of the coil 21, may readily be determined experimentally to suit the particular needs of the system with which the instrument is used and the character of indication that is desired.

The base 10 also has a pair of pockets 46 and 47 formed therein that are adapted to receive insulated contact terminals 48 and 49. Each of the contact terminals has an insulating sleeve 50 surrounding the shank portion of the terminal. An insulating plate 51, preferably of fish paper, underlies the rectangular head 52 of the contact terminal and an insulating washer 53 insulates the terminal nuts 54 from the base 10 of the instrument. A suitable binding nut 55 is also preferably carried by each of the terminal posts 48 and 49 to effectively connect the instrument to the system with which it is to be used.

Figure 9:
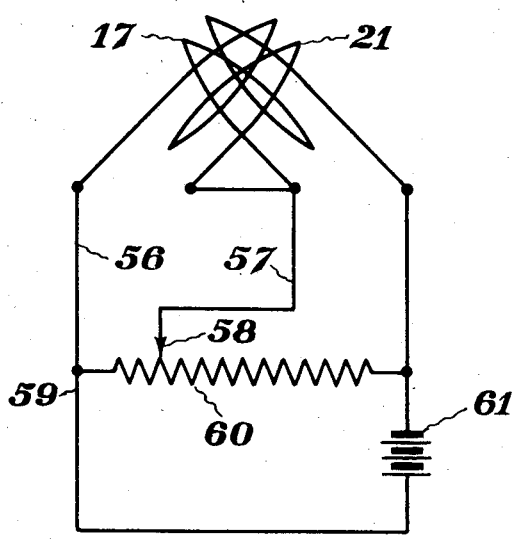
Fig. 9 is a diagrammatic view of a modification of the control circuit adapted to be used with the instrument shown in the preceding figures.

The modified form of control system shown in Fig. 9 is particularly adapted to be used with an instrument in which the magnetic influence of the coils 17 and 21 on the magnetizable armature 22 is substantially the same for the same degree of energization and in which the electrical resistance of the coil 17 is substantially the same as the resistance of the coil 21. For an instrument of this character, two leads 56 and 57, one of which extends to the movable contact member 58 and the other of which connects with one side 59 of the battery, are required. In this control system the elements of the control system are diagrammatically illustrated. The rheostat 60 is shown as connected directly across the terminals of a suitable storage battery or other source of energy and the coils 17 and 21 are connected in series relation with each other and in shunt relation with the source of energy. The movement of the contact element 58 from one end of the rheostat 60 to the other end differentially energizes the coils 17 and 21 from a deenergized to a fully energized condition depending upon the position of the contact element 58.

The modified form of instrument shown in Figs. 10 and 11 embodies a hollow solenoid 62 that is preferably adapted to establish a unidirectional field. An actuating solenoid 63 that is preferably made up of a pair of opposed windings 64 and 65 that are connected as indicated in the diagrammatic view of the circuit relation shown in Fig. 12, serves to deflect the magnetic armature 66 of substantially X-shape to equal degree in each direction from its normal position in alignment with the axis of the solenoid 62, depending upon which of the windings 64 and 65 predominates as will hereinafter be explained more clearly.

The armature 66 which is formed of soft iron or other magnetic material has a pair of opposed arms 67 and 68 that are somewhat longer than the opposed arms 69 and 70 in order that the influence of the solenoid 63 on the arm 68 may be greater than the influence of the winding 62 on the arm 67. By arranging the relative length of the arms 67 and 68 with relation to the arms 69 and 70, different scale deflections may be obtained for different degrees of energization of the windings of solenoids 62 and 63. Also, by changing the relative length of the arms 67, 68, 69 and 70 of the armature, different directions of the same actuating magnetic flux from the windings 64 and 65 produce different degrees of deflection of the armature to thereby compensate for the offsetting of the windings relative to the armature.

The indicator vane 71 is carried by a staff that pivotally supports the armature 66 and that is swingable therewith. The end portion 72 of the arm 71 extends beyond the pivotal support in order to counter-balance the weight of the arm. An adjusting and calibrating weight 73 that is preferably formed of a very thin piece of non-magnetic material is arranged to be adjusted to different biasing positions in order to calibrate the instrument and also to bring the indicator vane 71 to the empty or zero position indicated by "E" of the scale, when the solenoids 62 and 63 are deenergized. A supporting plate 74 of substantially the form of supporting plate 26 described in connection with the previously described instrument serves to provide a bearing for the upper end of the armature staff. The control system diagrammatically illustrated in Fig. 12 shows the method of connecting the windings of the instrument in such manner that the field produced by the solenoid 62 will tend to draw the indicating vane 71 to a position in alignment with the axis of solenoid 62 whereas the solenoid 63 will be energized to substantially the same degree in opposite direction for different extreme positions of the contact member 75 on the rheostat 76.

The control circuit shown in Fig. 12 illustrates a suitable connection for accomplishing this purpose. The field winding that is diagrammatically shown as coil 62 in Fig. 12 is connected in series relation with a winding 64 that is wound on solenoid 63. The two windings 62 and 64 are connected directly across the terminals of the battery or other source of direct or alternating energy 77.

A second winding 65 is mounted on the solenoid 63 in such direction relative to the winding 64 as to set up a magnetic field in opposition to the field produced by winding 64. The magnetizing turns of the windings 64 and 65 are so related that the resultant magnetic effect of the solenoid 63 upon the armature for the contact member 75 in its extreme left-hand position will be substantially equal to but opposite the resultant magnetic effect of the winding 63 on the armature when the contact member 75 is in its extreme right-hand position. This is a matter of ready computation and trial adjustment, being dependent upon a greater number of magnetizing turns in the winding 65 than in the winding 64, the relative resistance of the rheostat 76, and the relative length of the arms 67, 68, 69 and 70 of the armature. The nearness of the armature to the actuating solenoids also has considerable effect.

The rheostat 76, which is connected in series relation with the winding 65 of the solenoid 63, is preferably also connected to the grounded terminal 78 of the battery. This may be the base of the instrument if a grounded system is used. The movable contact element 75 is also connected to the grounded terminal of the battery in order that it will only be necessary to provide one connection that extends from the instrument to the remote station at which the resistor 76 is located. This is conductor 79 in the proposed system. By grounding the contact 75 and by grounding one end of the resistor 76, all fire hazards that might arise from short circuiting of parts of the resistance 76 are avoided and the expense of manufacture of the instrument is greatly reduced.

The operation of the instrument shown in Figs. 10 and 11 is substantially as follows:
When the contact member 75 occupies its extreme left-hand position, the energization of coil 65 is greatly reduced by reason of the relative resistance of the rheostat 76 and the winding 64. With the contact member in this position, the actuating windings 64 and 65 of the solenoid 63 produce a resultant magnetic actuating field of maximum degree in the direction of the arrow associated with winding 64. The shape of the armature 66, the ratio of the resistance of the different steps of the rheostat 76, and the number of turns of the winding 65 are so proportioned that the energization produced by the winding 65 is substantially equal to and opposite in direction to the energization produced by winding 64 when the contact member 75 is at the middle position of its travel. When the contact member 75 is moved to its extreme right-hand position, thereby grounding one terminal of the winding 65, the winding 65 is energized to its highest degree and, by reason of its direct connection across the battery or other source of energy, there is provided a resultant magnetic flux in the direction of the arrow associated with the winding 65 that is of substantially the same amplitude as the resultant magnetic flux produced in the solenoid 63 with the contact 65 in its other extreme position. This provides an instrument having a very wide range of movement that is reasonably accurate and that requires only one connector extending from the rheostat unit to the indicator. By grounding the movable contact of the rheostat the rheostat may be made of far less expensive design than is required when the contact member is subjected to different potentials.

Fig. 13 shows a modified control system in which the voltage applied to the adjustable rheostat 80 is only a portion of the entire voltage from the battery 81 and also in which one terminal of each of the control coils 82 and 83 of the instrument and one terminal of the rheostat 80 as well as the movable contact element 84 are grounded. This relation greatly reduces the cost of manufacture. A supplemental resistor 85 is connected in series with the actuating coil 83 to provide a system in which the actuating coil can be completely shunted. The coil 82 is preferably of very fine wire of relatively high resistance. The coil 83 may be of any suitable resistance to give the necessary energizing ampere-turns so that, when fully energized, the magnetizing influence of coil 83 will be substantially the same as the magnetizing influence of coil 82. The resistor may be of any desired material and is preferably mounted in the instrument case.

The principal advantages of this simplified circuit arrangement result from the use of a single insulated fixed terminal on the rheostat. This permits the use of a single connecting lead extending to the actuating rheostat, the return conducting path being provided by a grounded return.

Although I have described only a few desirable applications of my invention, it is capable of many other applications that will be apparent to those skilled in the art.

What I claim is:

1. An electrical indicating instrument comprising a base of die cast material having a pair of winding receiving pockets formed therein one of which is at a higher elevation than the other, a winding secured within the higher one of said pockets, a second winding disposed partially within the first winding and partially positioned by said pocket of higher elevation and partially supported by said first winding, a pivotally mounted armature of magnetizable material partially entering each of said solenoids within its range of movement, a damping chamber formed in said base, a damping vane carried by the pivotal support for said armature operating in said chamber to dampen the movement of said armature, and a cover secured in place by a single screw closing said pocket.

2. An indicating instrument comprising a base, a hollow solenoid mounted on the base, a second solenoid extending partially within the said first named solenoid and partially supported thereby, an armature of magnetizable material mounted to move partially within each of said solenoids and adapted to be controlled thereby, said armature having an arm on the side thereof adjacent one of said solenoids of greater magnetic reluctance than the portion of said armature on the same side thereof and on the other side of the pivotal support therefor.

3. An electrical indicating instrument comprising means for producing a magnetic field, an armature of magnetic material pivotally mounted to move within said field and normally held in a neutral position therein, an actuating solenoid mounted adjacent said armature, said armature being non-symmetrical with respect to its pivotal axis, said actuating solenoid having a pair of opposed windings mounted thereon, said armature having a portion which extends nearer to the magnetic center of one of the windings of said solenoid in one of the extreme positions of the armature than other portions of said armature in the opposite extreme position of the armature.

4. An electrical indicating instrument comprising a solenoid for producing a magnetic field, an armature of magnetic material pivotally mounted to move within said field, and an actuating coil mounted adjacent said armature, said armature having a plurality of non-symmetrically formed arms of magnetic material extending radially outward from a common center.

5. An electrical indicating instrument comprising a solenoid for producing a magnetic field, an armature of magnetic material pivotally mounted to move within said field, and an actuating coil mounted adjacent said armature, said armature having a plurality of non-symmetrically formed arms of magnetic material extending radially outward from a common center, said arms being of materially different radial length.

In testimony whereof I affix my signature.

WILLIAM C. McCOY.